(12) United States Patent
Uchiyama et al.

(10) Patent No.: US 11,196,040 B2
(45) Date of Patent: Dec. 7, 2021

(54) NEGATIVE ELECTRODE MATERIAL AND NON-AQUEOUS ELECTROLYTE SECONDARY BATTERY

(71) Applicant: Panasonic Intellectual Property Management Co., Ltd., Osaka (JP)

(72) Inventors: Yohei Uchiyama, Hyogo (JP); Taisuke Yamamoto, Nara (JP); Tatsuya Akira, Osaka (JP); Norihisa Yamamoto, Osaka (JP); Hiroshi Minami, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 16/464,817

(22) PCT Filed: Nov. 17, 2017

(86) PCT No.: PCT/JP2017/041409
§ 371 (c)(1),
(2) Date: May 29, 2019

(87) PCT Pub. No.: WO2018/101072
PCT Pub. Date: Jun. 7, 2018

(65) Prior Publication Data
US 2019/0319261 A1   Oct. 17, 2019

(30) Foreign Application Priority Data

Nov. 30, 2016 (JP) .............................. JP2016-233566

(51) Int. Cl.
*H01M 4/36* (2006.01)
*H01M 4/38* (2006.01)
(Continued)

(52) U.S. Cl.
CPC ............ *H01M 4/364* (2013.01); *H01M 4/386* (2013.01); *H01M 4/5825* (2013.01); *H01M 4/625* (2013.01); *H01M 2004/027* (2013.01)

(58) Field of Classification Search
CPC .. H01M 10/05; H01M 10/0566; H01M 4/133; H01M 4/485; H01M 4/364
See application file for complete search history.

(56) References Cited

U.S. PATENT DOCUMENTS

2009/0186267 A1\*  7/2009 Tiegs ................... H01M 4/625
                                                       429/129
2014/0363741 A1    12/2014 Lee et al.
(Continued)

FOREIGN PATENT DOCUMENTS

CN        103258992 A     8/2013
JP        4-363865 A      12/1992
(Continued)

OTHER PUBLICATIONS

Yoshikawa; Hiroki, Nonaqeous Solvent Secondary Battery, Dec. 16, 1992, p. 8, Paragraph [0024] Machine Translation (Year: 1992).\*
(Continued)

*Primary Examiner* — Maria Laios
*Assistant Examiner* — Bartholomew A Hornsby
(74) *Attorney, Agent, or Firm* — Westerman, Hattori, Daniels & Adrian, LLP

(57) ABSTRACT

Disclosed is a negative electrode material including: a lithium silicate phase that contains a lithium silicate; and silicon particles that are dispersed in the lithium silicate phase, wherein the silicon particles have a crystallite size of 10 nm or more, and the lithium silicate has a composition represented by the following formula: $Li_2Si_2O_5 \cdot (x-2)SiO_2$, where $2 < x \leq 18$ is satisfied.

8 Claims, 2 Drawing Sheets

(51) Int. Cl.
    *H01M 4/58*     (2010.01)
    *H01M 4/62*     (2006.01)
    *H01M 4/02*     (2006.01)

(56) References Cited

U.S. PATENT DOCUMENTS

| | | |
|---|---|---|
| 2015/0147658 A1 | 5/2015 | Nakagaki et al. |
| 2016/0087270 A1* | 3/2016 | Yoshikawa ........ H01M 10/0525 429/218.1 |
| 2016/0164076 A1* | 6/2016 | Essaki .................. H01M 4/587 429/158 |
| 2017/0214041 A1 | 7/2017 | Minami et al. |

FOREIGN PATENT DOCUMENTS

| | | | |
|---|---|---|---|
| JP | H04363865 A | * | 12/1992 |
| JP | 2014-220216 A | | 11/2014 |
| JP | 2015-512130 A | | 4/2015 |
| JP | 2015-153520 A | | 8/2015 |
| WO | 2016/035290 A1 | | 3/2016 |
| WO | 2016/121324 A1 | | 8/2016 |
| WO | WO-2016136180 A1 | * | 9/2016 ............ H01M 4/405 |

OTHER PUBLICATIONS

Asami, JPH04363865A Translation "Non-aqueous solvent secondary battery", 1992 (Year: 1992).*
International Search Report dated Jan. 16, 2018, issued in counterpart International Application No. PCT/JP2017/041409 (2 pages).
English Translation of Search Report dated Sep. 3, 2021, issued in counterpart CN Application No. 201780073638.X. (2 pages).

* cited by examiner

NEGATIVE ELECTRODE MATERIAL AND NON-AQUEOUS ELECTROLYTE SECONDARY BATTERY

TECHNICAL FIELD

The present invention relates primarily to an improvement in a negative electrode in a non-aqueous electrolyte secondary battery.

BACKGROUND ART

In recent years, non-aqueous electrolyte secondary batteries, in particular, lithium ion secondary batteries are expected to be used for small consumer applications and also to be used as power storage apparatuses and power sources for electric vehicles because they have a high voltage and a high energy density. Under the circumstances where demand is increasing for batteries with a higher energy density, a silicon-containing material that can be alloyed with lithium is expected to be used as a negative electrode active material that has a high theoretical capacity density.

However, a silicon-containing material has a large irreversible capacity, and thus there is a problem in that the initial charge/discharge efficiency (in particular, the ratio of the initial discharge capacity relative to the initial charge capacity) is low. To address this, various techniques are proposed to introduce lithium in an amount corresponding to the irreversible capacity into a silicon-containing material in advance.

For example, Patent Literature 1 proposes a method in which a powder of silicon oxide represented by $SiO_x$ ($0<x\leq2$) and a powder of lithium source (for example, LiH) are mixed and baked to obtain a lithium-containing silicon oxide powder. The lithium-containing silicon oxide powder disclosed in Patent Literature 1 contains $Li_4SiO_4$, $Li_2SiO_3$ or $Li_2Si_2O_5$. These lithium silicates react with moisture and leach out an alkali component, which may cause a problem during production of negative electrodes or cause the negative electrodes to degrade. Accordingly, Patent Literature 1 proposes lithium-containing silicon oxide powders in which the amounts of, in particular, $Li_4SiO_4$ and $Li_2SiO_3$ that are likely to cause an alkali component to leach out are reduced.

A silicon oxide powder represented by $SiO_x$ is obtained by, for example, cooling a vapor of silicon monoxide generated by heating a mixture of silicon dioxide and silicon, and causing precipitation. In this case, microscopically, the silicon oxide powder is a composite of silicon dioxide and silicon particles that have a small particle size corresponding to a crystallite size of about 5 nm.

Patent Literature 2 proposes a negative electrode active material for use in a non-aqueous electrolyte secondary battery, the negative electrode active material containing a lithium silicate phase represented by $Li_{2z}SiO_{2+z}$ ($0<z<2$) and silicon particles that are dispersed in the lithium silicate phase. The average particle size of the silicon particles is set to 500 nm or less (preferably 50 nm or less) before the initial charge is performed, and thereby the volume change during charge and discharge is reduced, and collapse of the electrode structure is likely to be suppressed.

CITATION LIST

Patent Literatures

[PTL 1] Laid-Open Patent Publication No. 2015-153520
[PTL 2] WO 2016/35290

SUMMARY OF INVENTION

In the case where silicon particles are dispersed in the lithium silicate phase, the surface area of the silicon particles increases as the crystallite size and the average particle size of the silicon particles are decreased, as a result of which the irreversible capacity is likely to increase. From the viewpoint of obtaining good cycle characteristics and ease of designing a high capacity negative electrode, it is desirable that the silicon particles have a crystallite size of 10 nm or more.

On the other hand, when the silicon particles have a crystallite size of 10 nm or more, a volume change that causes cracking in the silicon particles and the lithium silicate occurs during charge and discharge. The occurrence of cracking facilitates leaching-out of an alkali component and degradation of silicon. It is difficult to suppress such a phenomenon even when a component, such as $Li_2Si_2O_5$, that is unlikely to cause an alkali component to leach out is used as the main component of a lithium silicate.

In view of the above, an aspect of the present disclosure relates to a negative electrode material including: a lithium silicate phase; and silicon particles that are dispersed in the lithium silicate phase, wherein the silicon particles have a crystallite size of 10 nm or more, and the lithium silicate phase has a composition represented by the following formula: $Li_2Si_2O_5.(x-2)SiO_2$, where $2<x\leq18$ is satisfied.

Another aspect of the present disclosure relates to a non-aqueous electrolyte secondary battery including: a negative electrode that includes the negative electrode material described above and a graphite; a positive electrode that is capable of electrochemically absorbing and desorbing lithium; and a non-aqueous electrolyte.

According to the present disclosure, in the case where a negative electrode material that contains a lithium silicate phase and silicon particles that are dispersed in the lithium silicate phase is used, even when the silicon particles have a crystallite size of 10 nm or more, a non-aqueous electrolyte secondary battery that has excellent cycle characteristics can be obtained.

DESCRIPTION OF EMBODIMENT

Figure 1:
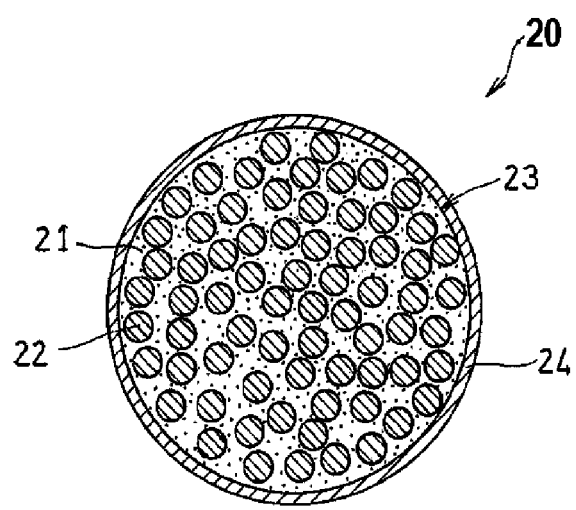
FIG. 1 is a schematic cross-sectional view showing a configuration of an LSX particle according to an embodiment of the present invention.

A negative electrode material according to an embodiment of the present invention (hereinafter also referred to as "negative electrode material LSX") contains a lithium silicate phase and silicon particles that are dispersed in the lithium silicate phase. The lithium silicate phase has a composition represented by the following formula: $Li_2Si_2O_5.(x-2)SiO_2$, where $2<x\leq18$ is satisfied, and the silicon particles are made of crystallites that have a crystallite size of 10 nm or more. The silicon particles have a particulate phase of silicon (Si) elementary substance.

The lithium silicate phase does not have many sites that are reactive to lithium, and it is therefore unlikely to cause a new irreversible reaction during charge and discharge. Accordingly, excellent charge/discharge efficiency is exhibited during the initial charge and discharge.

On the other hand, a conventional $SiO_x$ that is obtained by cooling a vapor of silicon monoxide generated by heating a mixture of silicon dioxide and silicon, and causing precipitation is a composite of $SiO_2$ and silicon fine particles that have a crystallite size of about 5 nm, and contains a large amount of $SiO_2$. For this reason, for example, the following reaction takes place during charge and discharge. The reaction of $SiO_2$ in the formula (3) is an irreversible reaction, and the generation of $Li_4SiO_4$ is the main factor that reduces the initial charge/discharge efficiency.

$$SiO_x(2Si+2SiO_2)+16Li^++16e^-\rightarrow 3Li_4Si+Li_4SiO_4 \quad (1)$$

The following formulas are obtained by resolving the formula (1) with respect to Si and $2SiO_2$.

$$Si+4Li^++4e^-\rightarrow Li_4Si \quad (2)$$

$$2SiO_2+8Li^++8e^-\rightarrow Li_4Si+Li_4SiO_4 \quad (3)$$

In the present embodiment, the silicon particles that are dispersed in the lithium silicate phase are larger than silicon fine particles that are contained in a conventional $SiO_x$, and have a crystallite size of 10 nm or more. With the use of silicon particles that have a crystallite size of 10 nm or more, the surface area of the silicon particles can be reduced, and thus degradation caused by generation of irreversible capacity is unlikely to occur, and good cycle characteristics are easily achieved. Also, a high capacity negative electrode is easily designed by changing the amount of silicon. The crystallite size of the silicon particles is calculated from the half-width of a diffraction peak attributed to the Si (111) plane in an X-ray diffraction (XRD) pattern of the silicon particles by using the Scherrer formula.

Even when the silicon particles have a crystallite size of 10 nm or more, because the silicon particles are dispersed in the lithium silicate phase, expansion and contraction of the negative electrode material LSX during charge and discharge are suppressed. For this reason, the negative electrode material LSX has excellent structural stability. However, if the average particle size of the silicon particles is too large, cracking is likely to occur in the silicon particles. The silicon particles preferably have an average particle size of 500 nm or less, more preferably 200 nm or less, and even more preferably 50 nm or less. The average particle size of the silicon particles is determined by observing an SEM (scanning electron microscope) microscopic image of a cross section of the negative electrode material. Specifically, the average particle size of the silicon particles is determined by averaging the largest diameters of arbitrarily selected 100 silicon particles. Each silicon particle is formed by a collection of a plurality of crystallites.

The formula: $Li_2Si_2O_5.(x-2)SiO_2$ can also be expressed as $Li_2O.2SiO_2.(x-2)SiO_2$ (or $Li_2O.xSiO_2$). That is, it can be deemed that a $SiO_2$-like component is contained in $(x-2)$-fold molar excess relative to 1 mol of $Li_2O$ as compared with $Li_2Si_2O_5$. As described above, in the lithium silicate contained in the negative electrode material LSX, $2<x\leq 18$ is satisfied, and thus the proportion of alkali component ($Li_2O$) is smaller than that of $Li_2Si_2O_5$. For this reason, even if cracking occurs in the negative electrode material LSX that contains silicon particles that have a crystallite size of 10 nm or more during charge and discharge, the alkali component does not substantially leach out, and silicon is also unlikely to degrade.

The composition of the lithium silicate phase can be analyzed in the following manner.

First, the mass of a sample of the negative electrode material LSX is measured. After that, the amounts of carbon, lithium and oxygen contained in the sample are calculated in the following manner. Next, the amount of carbon is subtracted from the mass of the sample, the amounts of lithium and oxygen in the remaining amount of the sample are calculated, and the value of x is determined from the molar ratio of lithium (Li) to oxygen (O).

The amount of carbon is measured by using a carbon.sulfur analysis apparatus (for example, EMIA-520 available from HORIBA, Ltd.). A sample is measured and placed on a magnetic board, and a combustion improving agent is added thereto. The magnetic board is placed in a combustion furnace (carrier gas: oxygen) heated to 1350° C., and the amount of carbon dioxide gas generated during combustion is detected by infrared absorption. A calibration curve is created by using, for example, carbon steel (the amount of carbon being 0.49%) available from Bureau of Analysed Sampe. Ltd., and the amount of carbon contained in the sample is calculated (high-frequency induction heating furnace combustion-infrared absorption method).

The amount of oxygen is measured by using an oxygen-.nitrogen.hydrogen analysis apparatus (for example, EGMA-830 available from HORIBA, Ltd.). A sample is encapsulated into Ni capsules, and the Ni capsules are loaded into a carbon crucible heated by a power of 5.75 kW together with Sn pellets and Ni pellets that serve as flux, and carbon monoxide gas emitted therefrom is detected. A calibration curve is created by using Y2O3 that is a standard sample, and the amount of oxygen contained in the sample is calculated (inert gas fusion-non-dispersive infrared absorption method).

The amount of lithium is measured by completely dissolving a sample in heated fluonitric acid (a heated mixture of hydrofluoric acid and nitric acid), filtering and removing carbon remaining in the dissolved sample, and then analyzing the obtained filtrate based on inductively coupled plasma-atomic emission spectroscopy (ICP-AES). A calibration curve is created by using a commercially available lithium standard solution, and the amount of lithium contained in the sample is calculated.

In the negative electrode material LSX, in order to sufficiently suppress the occurrence of cracking in the silicon particles and the lithium silicate phase and leaching of the alkali component through cracks during charge and discharge, the larger the amount of $SiO_2$-like component contained in $Li_2O.xSiO_2$, the more preferable it is. Specifically, it is preferable that $2.1\leq x\leq 18$ is satisfied, and it is more preferable that $4\leq x\leq 18$ is satisfied. For example, in the case where $x=2.1$, it can be deemed that $SiO_2$ is contained in 0.1-fold molar excess relative to 1 mol of $Li_2O$ as compared with $Li_2Si_2O_5$. In the case where $x=4$, it can be deemed that the $SiO_2$-like component is contained in 2-fold molar excess relative to 1 mol of $Li_2O$ as compared with $Li_2Si_2O_5$.

The negative electrode material LSX preferably forms a particulate material (hereinafter also referred to as "LSX particles") that preferably has an average particle size of 1 to 25 μm, and more preferably 4 to 15 μm. With this configuration, a stress caused by a volume change in the negative electrode material LSX during charge and discharge is more easily relaxed, and good cycle characteristics are easily obtained. Also, the LSX particles have an appropriate surface area, and thus a capacity reduction caused by a side reaction with the non-aqueous electrolyte is also suppressed.

As used herein, the average particle size of the LSX particles refers to the particle size (volume average particle size) at 50% of the volume cumulative value in a particle size distribution obtained by a laser diffraction scattering method. As the measurement apparatus, for example, LA-750 available from HORIBA, Ltd. can be used.

The LSX particles each preferably include a conductive material that covers at least a portion of the surface of the LSX particle. The lithium silicate phase has poor electron conductivity, and thus the conductivity of the LSX particles tends to be low. However, by covering the surface of the LSX particles with a conductive material, the conductivity can be increased significantly. The conductive layer preferably has a small thickness that does not substantially affect the average particle size of the LSX particles.

Next, a method for producing the negative electrode material LSX will be described in detail.

As the raw material of the lithium silicate, a mixture of silicon dioxide and a lithium compound can be used. The lithium silicate represented by formula: $Li_2Si_2O_5 \cdot (x-2)SiO_2$, where $2 < x \leq 18$ is satisfied, is obtained by mixing the raw materials such that the atomic ratio Si/Li of silicon to lithium is greater than 1, and then baking the mixture. As shown in Table 1, when the Si/Li ratio is greater than 1, computationally, a lithium silicate in which $2 < x$ is satisfied is obtained. From the viewpoint of suppressing leaching-out of the alkali component as much as possible, it is preferable to mix the raw materials such that the Si/Li ratio is 1.05 to 9.

TABLE 1

| x | $Li_2O \cdot xSiO_2$ | Chemical Formula | Atomic Ratio | | |
|---|---|---|---|---|---|
| | | | Li | Si | O |
| 0.5 | $Li_2O \cdot 0.5SiO_2$ | $Li_4SiO_4$ | 4 | 1 | 4 |
| 1 | $Li_2O \cdot SiO_2$ | $Li_2SiO_3$ | 2 | 1 | 3 |
| 2 | $Li_2O \cdot 2SiO_2$ | $Li_2Si_2O_5$ | 2 | 2 | 5 |
| 3 | $Li_2O \cdot 3SiO_2$ | $Li_2Si_3O_7$ | 2 | 3 | 7 |
| 10 | $Li_2O \cdot 10SiO_2$ | $Li_2Si_{10}O_{21}$ | 2 | 10 | 21 |
| 18 | $Li_2O \cdot 18SiO_2$ | $Li_2Si_{18}O_{37}$ | 2 | 18 | 37 |

As shown in Table 1, in the case where x=2, the atomic ratio Si/Li of Si to Li in the lithium silicate phase is 2/2=1. Accordingly, computationally, in the case where Si/Li in the lithium silicate phase is greater than 1, $2 < x$ is satisfied. In the case where Si/Li≤9, $x \leq 18$ is satisfied. Thus, even if a measurement error is considered, in the case where the atomic ratio Si/Li in the lithium silicate phase measured by XPS or the like is 1.05 or more, $2.1 \leq x$ is satisfied, and in the case where Si/Li is 4 or more, $8 \leq x$ is satisfied.

Lithium carbonate, lithium oxide, lithium hydroxide, lithium hydride or the like can be used for the lithium compound. These may be used alone or in a combination of two or more.

The mixture containing silicon dioxide and a lithium compound is preferably heated in air at 400° C. to 1200° C., and more preferably 800° C. to 1100° C. to cause the silicon dioxide and the lithium compound to react with each other.

Step (ii)

Next, a raw silicon material is blended with the lithium silicate to obtain a composite. Here, control is performed such that the final silicon particles have a crystallite size of 10 nm or more, the crystallite size being calculated from the half-width of a diffraction peak attributed to the Si (111) plane in an XRD pattern of the silicon particles by using the Scherrer formula. For example, the mixture of the lithium silicate and the raw silicon material may be pulverized while applying a shearing force thereto.

Specifically, first, a raw silicon material and a lithium silicate are mixed at a mass ratio of, for example, 20:80 to 95:5. As the raw silicon material, crude silicon particles that have an average particle size of about several to several tens of micrometers may be used. Next, the mixture is stirred and pulverized into fine particles by using a pulverizing apparatus such as a ball mill. The raw silicon material and the lithium silicate may be separately pulverized into fine particles, and thereafter the separately pulverized raw silicon material and lithium silicate may be mixed. Alternatively, instead of using a pulverizing apparatus, silicon nanoparticles and lithium silicate nanoparticles may be separately synthesized and then mixed.

Next, the mixture that has been pulverized into fine particles is baked by heating at 450° C. to 1000° C. in, for example, an inert atmosphere (for example, an argon atmosphere, a nitrogen atmosphere or the like). At this time, the mixture may be baked while applying a pressure to the mixture through hot pressing or the like so as to produce a sintered product of the mixture (negative electrode material LSX). Lithium silicates are stable at 450° C. to 1000° C. and do not substantially react with silicon, and thus even if a capacity reduction occurs, the capacity reduction is minor.

After that, the sintered product may be pulverized into particulates so as to obtain LSX particles. At this time, by selecting pulverization conditions as appropriate, LSX particles that have an average particle size of 1 to 25 μm can be obtained.

Step (iii)

Next, a conductive layer may be formed by covering at least a portion of the surface of each LSX particle with a conductive material. The conductive material is preferably electrochemically stable, and it is preferable to use a carbon material. As the method for covering the surface of the particulate material with a carbon material, for example, a CVD method in which a hydrocarbon gas such as acetylene or methane is used as a raw material, or a method in which coal pitch, petroleum pitch, phenol resin or the like is mixed with a particulate material, and the mixture is heated and carbonized may be used. Alternatively, carbon black may be attached to the surface of the particulate material.

From the viewpoint of ensuring conductivity and diffusibility of lithium ions, the conductive layer preferably has a thickness of 1 to 200 nm, and more preferably 5 to 100 nm. The thickness of the conductive layer can be measured by observing a cross section of the particles using an SEM or a TEM.

Step (iv)

A step of washing the LSX particles with an acid may be performed. For example, by washing the LSX particles with an acidic aqueous solution, a trace amount of components such as $Li_2SiO_3$ that may be generated when the raw silicon material and the lithium silicate are blended to obtain a composite can be dissolved and removed. As the acidic aqueous solution, an aqueous solution of an inorganic acid such as hydrochloric acid, hydrofluoric acid, sulfuric acid, nitric acid, phosphoric acid or carbonic acid, or an aqueous solution of an organic acid such as citric acid or acetic acid can be used.

FIG. 1 schematically shows a cross section of an LSX particle 20 that is an example of the negative electrode material LSX.

The LSX particle 20 includes a lithium silicate phase 21 and silicon particles 22 that are dispersed in the lithium silicate phase. A conductive layer 24 is formed on the surface of a matrix particle 23 that is formed of the lithium silicate phase 21 and the silicon particles 22. The conductive layer 24 is formed of a conductive material that covers at least a portion of the surface of the LSX particle or the matrix particle 23.

It is preferable that the silicon particles 22 are dispersed substantially uniformly in the lithium silicate phase 21. The matrix particle 23 has an islands-in-the-sea structure in which, for example, fine silicon particles are dispersed in a matrix of the lithium silicate phase 21. In this case, in a cross section of the matrix particle 23, the silicon particles 22 (elementary substance Si) are substantially uniformly scattered without being non-uniformly present in a partial region It is preferable that the lithium silicate phase 21 and the silicon particles 22 are both made of a collection of fine particles. The lithium silicate phase 21 is preferably made of particles that are even finer than the silicon particles 22. In this case, in an X-ray diffraction (XRD) pattern of the LSX particle 20, the intensity of a diffraction peak attributed to the (111) plane of the elementary substance Si is larger than the intensity of a diffraction peak attributed to the (111) plane of the lithium silicate.

Figure 2:
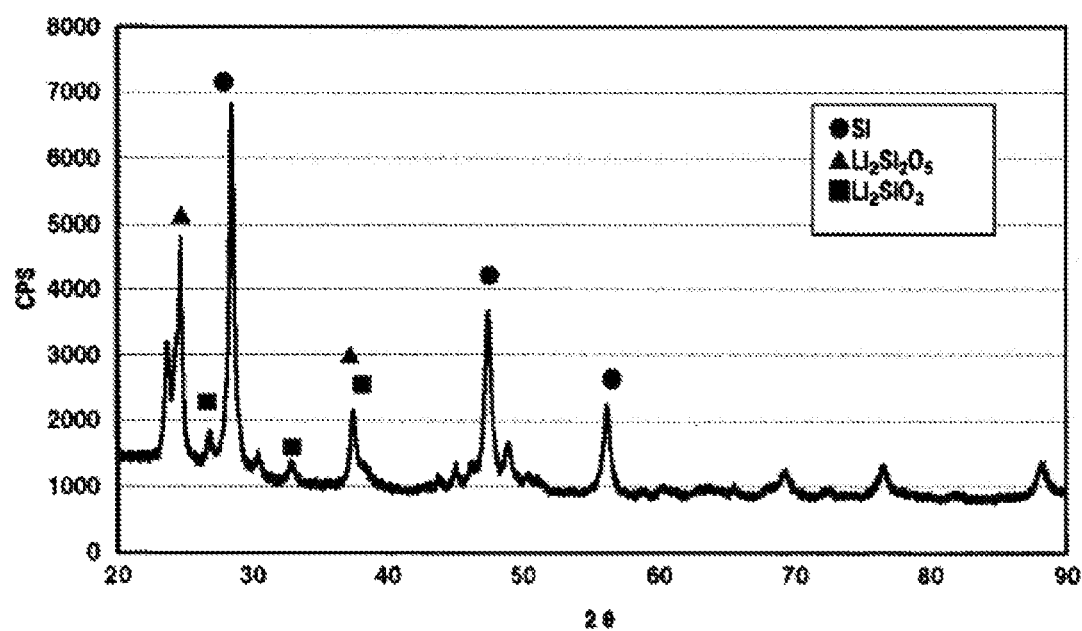
FIG. 2 is a diagram showing an example of an XRD pattern of matrix particles before charge and discharge are performed.

FIG. 2 shows an example of an XRD pattern of the matrix particle 23 before charge and discharge are performed.

Peaks derived from $Li_2Si_2O_5$ are clearly observed, from which it can be seen that $Li_2Si_2O_5$ is the main component. The intensity of peaks derived from a lithium silicate other than $Li_2Si_2O_5$ is weak, and peaks derived from elementary substance Si are larger than the peaks derived from the lithium silicates. Lithium silicates in which $SiO_2$ is in excess as compared with $Li_2Si_2O_5$ are amorphous, and thus peaks derived therefrom are not observed.

The matrix particle 23 may contain a third component in addition to the lithium silicate phase 21 and the silicon particles 22. For example, the lithium silicate phase 21 may contain crystalline or amorphous $SiO_2$ in addition to the lithium silicate. The amount of $SiO_2$ in the matrix particle 23 measured by Si-NMR is, for example, preferably 30 mass % or less, and more preferably 7 mass % or less.

From the viewpoint of increasing the capacity and improving cycle characteristics, the amount of the silicon particles 22 (elementary substance Si) in the matrix particle 23 measured by Si-NMR is preferably 20 mass % to 95 mass %, and more preferably 35 mass % to 75 mass %. With this configuration, a high charge/discharge capacity can be ensured, and diffusibility of lithium ions is improved, and excellent load characteristics are easily obtained. Also, the surface of the silicon particles that is exposed without being covered with the lithium silicate phase and thus comes into contact with the non-aqueous electrolyte is reduced, and thus the reduction in the cycle characteristics is suppressed.

The lithium silicate phase 21 is mostly (for example, 90 mass % or more) composed of a lithium silicate represented by the formula: $Li_2Si_2O_5 \cdot (x-2)SiO_2$ or $Li_2O \cdot 2SiO_2 \cdot (x-2)SiO_2$ or $Li_2O \cdot xSiO_2$ ($2<x \leq 18$). Accordingly, the lithium silicate phase 21 does not substantially contain $Li_4SiO_4$ and $Li_2SiO_3$ that are likely to cause an alkali component to leach out. Furthermore, in the lithium silicate phase 21, the $SiO_2$-like component is in excess as compared with $Li_2Si_2O_5$, and thus the composition ratio of components having rather strong alkalinity is lower than that of $Li_2Si_2O_5$. Accordingly, even if cracking occurs in the matrix particle 23 or the silicon particles 22, a reduction in the charge/discharge capacity caused by deterioration of the elementary substance Si is unlikely to occur From the viewpoint of stability, ease of production, lithium ion conductivity, and the like, in the formula: $Li_2Si_2O_5 \cdot (x-2)SiO_2$, it is preferable that $2.1<x \leq 18$ is satisfied, and it is more preferable that $3 \leq x \leq 8$ is satisfied. In this case, in the lithium silicate phase 21, in addition to the $Li_2Si_2O_5$ phase, for example, the following phases are delocalized: $Li_2Si_3O_7$, $Li_2Si_4O_9$, $Li_2Si_5O_{11}$, $Li_2Si_6O_{13}$, $Li_2Si_7O_{15}$, $Li_2Si_8O_{17}$, $Li_2Si_9O_{19}$, and $Li_2Si_{10}O_{21}$, the compositions described above indicating the average composition of the entire composition including crystalline and amorphous solids. In particular, it is preferable that the $Li_2Si_2O_5$ phase is used as the main component (a component that has the highest mass), and the amount of $Li_2Si_2O_5$ in the lithium silicate phase 21 measured by Si-NMR is preferably greater than 15 mass %, and more preferably 40 mass % or more. Desirable Si-NMR measurement conditions are given below <Si-NMR Measurement Conditions>

Measurement apparatus: solid-state nuclear magnetic resonance spectrometer (INOVA-400) available from Varian Probe: Varian 7 mm CPMAS-2

MAS: 4.2 kHz

MAS rate: 4 kHz

Pulse: DD (45° pulse+signal acquisition time 1H decoupling)

Repetition time interval: 1200 sec

Observed frequency range: 100 kHz

Observed center: around −100 ppm

Signal acquisition time: 0.05 sec

Number of accumulations: 560

Sample amount: 207.6 mg

The silicon particles 22 have an average particle size of 500 nm or less, preferably 200 nm or less, and more preferably 50 nm or less before the initial charge is performed. By pulverizing the silicon particles 22 into fine particles as appropriate, the volume change during charge and discharge is reduced, and the structural stability is improved. The average particle size of the silicon particles 22 is determined by observing a cross section of the negative electrode material using an SEM or a TEM. Specifically, the average particle size of the silicon particles 22 is determined by averaging the largest diameters of arbitrarily selected 100 silicon particles 22.

Next, a non-aqueous electrolyte secondary battery according to an embodiment of the present invention will be described. The non-aqueous electrolyte secondary battery includes, for example, a negative electrode, a positive electrode, and a non-aqueous electrolyte that are described below

[Negative Electrode]

The negative electrode includes, for example, a negative electrode current collector and a negative electrode material mixture layer that is formed on the surface of the negative electrode current collector and contains a negative electrode active material. The negative electrode material mixture layer can be formed by applying a negative electrode slurry obtained by dispersing a negative electrode material mixture in a dispersion medium to the surface of the negative electrode current collector and drying the negative electrode slurry. The dried coating film may be rolled where necessary. The negative electrode material mixture layer may be formed on one or both surfaces of the negative electrode current collector.

The negative electrode material mixture contains, as an essential component, a negative electrode material LSX (or LSX particles) that serves as a negative electrode active material, and may contain optional components such as a binder, a conductive material and a thickener. The silicon particles contained in the negative electrode material LSX can absorb many lithium ions, and thus contribute to an increase in the capacity of the negative electrode.

It is preferable that the negative electrode active material further contains a carbon material that electrochemically absorbs and desorbs lithium ions. The negative electrode material LSX expands and contracts along with charging and discharging. Accordingly, if the proportion of the negative electrode material LSX in the negative electrode active material is increased, a contact failure is likely to occur between the negative electrode active material and the negative electrode current collector during charge and discharge. However, by using the negative electrode material LSX in combination with the carbon material, excellent cycle characteristics can be achieved while imparting a high capacity of the silicon particles to the negative electrode. The proportion of the negative electrode material LSX in the total amount of the negative electrode material LSX and the carbon material is, for example, preferably 3 to 30 mass %. With this configuration, both an increase in the capacity and an improvement in the cycle characteristics are easily achieved.

Examples of the carbon material include a graphite, a graphitizable carbon (soft carbon), a non-graphitizable carbon (hard carbon) and the like. Among them, it is preferable to use a graphite that has excellent stability during charge and discharge and also has a small irreversible capacity. As used herein, the graphite refers to a material that has a graphite crystalline structure. Examples of the graphite include a natural graphite, an artificial graphite, graphitized mesophase carbon particles, and the like. The carbon materials may be used alone or in a combination of two or more.

As the negative electrode current collector, a nonporous conductive substrate (a metal foil or the like) or a porous conductive substrate (a mesh, a net, a punched sheet or the like) is used. Examples of materials for forming the negative electrode current collector include stainless steel, nickel, nickel alloys, copper, copper alloys, and the like. The thickness of the negative electrode current collector is not particularly limited, but from the viewpoint of a balance between the strength of the negative electrode and a reduction in weight, the thickness of the negative electrode current collector is preferably 1 to 50 µm, and more preferably 5 to 20 µm.

Examples of the binder include resin materials, for example, fluorocarbon resins such as polytetrafluoroethylene, polyvinylidene fluoride (PVDF); polyolefin resins such as polyethylene and polypropylene; polyamide resins such as aramid resin; polyimide resins such as polyimide and polyamide imide; acrylic resins such as polyacrylic acid, polymethyl acrylate and ethylene-acrylic acid copolymers; vinyl resins such as polyacrylonitrile and polyvinyl acetate; polyvinyl pyrrolidone; polyether sulfone; rubber-like materials such as styrene-butadiene copolymer rubber (SBR); and the like. They may be used alone or in a combination of two or more.

Examples of the conductive material include: carbon blacks such as acetylene black; conductive fibers such as carbon fibers and metal fibers; carbon fluoride; metal powders such as aluminum powders; conductive whiskers such as zinc oxide and potassium titanate; conductive metal oxides such as titanium oxide; organic conductive materials such as phenylene derivatives; and the like. They may be used alone or in a combination of two or more.

Examples of the thickener include carboxymethyl cellulose (CMC), modified variants thereof (including salts such as a Na salt), cellulose derivatives (cellulose ether and the like) such as methyl cellulose; saponified polymers having a vinyl acetate unit such as polyvinyl alcohol; polyethers (polyalkylene oxides such as polyethylene oxide); and the like. They may be used alone or in a combination of two or more.

The dispersion medium is not particularly limited, but examples include water, alcohols such as ethanol, ethers such as tetrahydrofuran, amides such as dimethyl formamide, N-methyl-2-pyrrolidone (NMP), mixed solvents thereof, and the like.

[Positive Electrode]

The positive electrode includes, for example, a positive electrode current collector and a positive electrode material mixture layer that is formed on the surface of the positive electrode current collector. The positive electrode material mixture layer can be formed by applying a positive electrode slurry obtained by dispersing a positive electrode material mixture in a dispersion medium to the surface of the positive electrode current collector and drying the positive electrode slurry. The dried coating film may be rolled where necessary. The positive electrode material mixture layer may be formed on one or both surfaces of the positive electrode current collector.

As the positive electrode active material, a lithium composite metal oxide can be used. Examples include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, $Li_2MePO_4F$ (where M represents at least one of Na, Mg, Sc, Y, Mn, Fe, Co, Ni, Cu, Zn, Al, Cr, Pb, Sb and B). Here, a=0 to 1.2, b=0 to 0.9, and c=2.0 to 2.3. The value of a that indicates the molar ratio of lithium is the value immediately after the active material is produced, and varies during charge and discharge.

As the binder and the conductive material, the same materials as listed in the description for the negative electrode can be used. As the conductive material, a graphite such as a natural graphite or an artificial graphite may be used.

The shape and the thickness of the positive electrode current collector can be selected from the shape and the thickness range of the negative electrode current collector. Examples of materials for forming the positive electrode current collector include stainless steel, aluminum, aluminum alloys, titanium, and the like.

[Non-Aqueous Electrolyte]

The non-aqueous electrolyte contains a non-aqueous solvent and a lithium salt that is dissolved in the non-aqueous solvent. The concentration of the lithium salt in the non-aqueous electrolyte is, for example, 0.5 to 2 mol/L. The non-aqueous electrolyte may contain known additives.

As the non-aqueous solvent, for example, a cyclic carbonic ester, a linear carbonic ester, a cyclic carboxylic acid ester, and the like may be used. Examples of the cyclic carbonic ester include propylene carbonate (PC), ethylene carbonate (EC), and the like. Examples of the linear carbonic ester include diethyl carbonate (DEC), ethyl methyl carbonate (EMC), dimethyl carbonate (DMC), and the like. Examples of the cyclic carboxylic acid ester include γ-butyrolactone (GBL), γ-valerolactone (GVL), and the like. The non-aqueous solvents may be used alone or in a combination of two or more.

As the lithium salt, for example, lithium salts of chlorine-containing acid ($LiClO_4$, $LiAlCl_4$, $LiB_{10}Cl_{10}$ and the like), lithium salts of fluorine-containing acid ($LiPF_6$, $LiSbF_6$, $LiAsF_6$, $LiCF_3SO_3$, $LiCF_3CO_2$ and the like), lithium salts of fluorine-containing acid imide ($LiN(CF_3SO_2)_2$, $LiN(CF_3SO_2)(C_4F_9SO_2)$, $LiN(C_2F_5SO_2)_2$ and the like), lithium halides (LiCl, LiBr, LiI and the like), and the like can be used. The lithium salts may be used alone or in a combination of two or more.

[Separator]

Normally, it is desirable that a separator is interposed between the positive electrode and the negative electrode. The separator has high ion permeability, as well as an appropriate mechanical strength and insulation. As the separator, a micro-porous thin film, a woven fabric, a non-woven fabric or the like may be used. The material for forming the separator is preferably a polyolefin such as polypropylene or polyethylene.

The non-aqueous electrolyte secondary battery has, for example, a structure in which an electrode group, which is formed by spirally winding the positive electrode and the negative electrode with the separator interposed therebetween, and the non-aqueous electrolyte are housed in an outer casing. Alternatively, instead of the spirally-wound electrode group, other types of electrode groups may be used such as a stacked electrode group in which the positive electrode and the negative electrode are stacked with the separator interposed therebetween. The non-aqueous electrolyte secondary battery may have any shape such as, for example, a cylindrical shape, a prismatic shape, a coin shape, a button shape, or a laminate shape.

Figure 3:
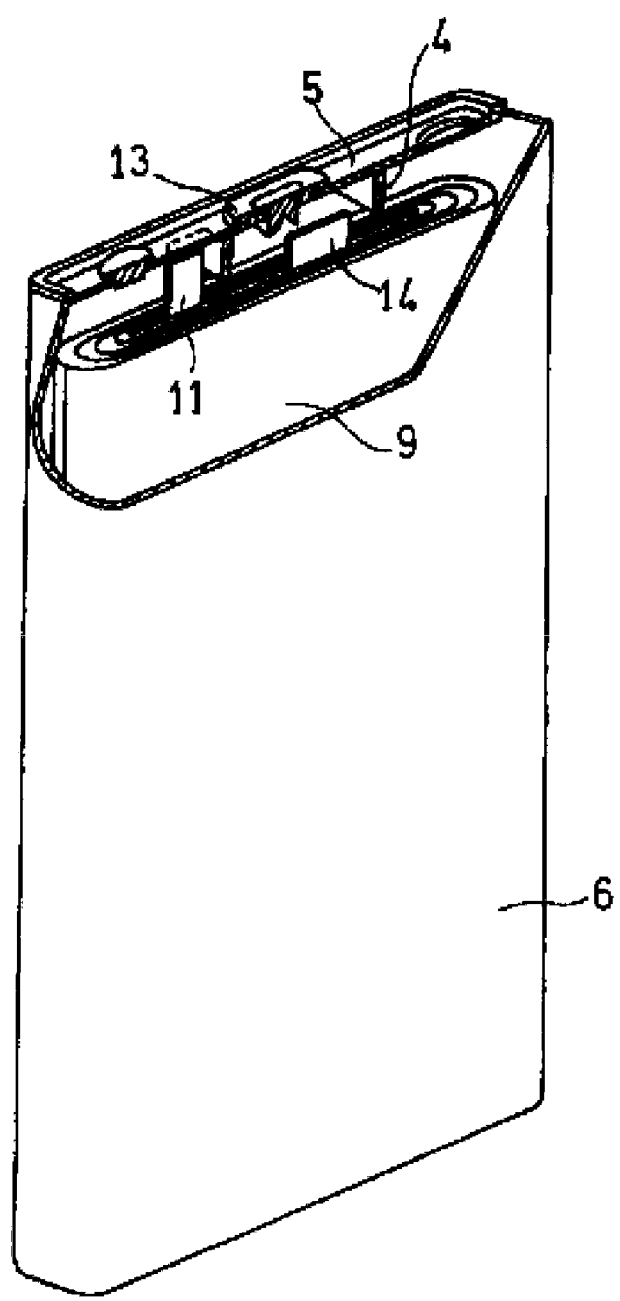
FIG. 3 is a schematic partial cutaway perspective view of a non-aqueous electrolyte secondary battery according to an embodiment of the present invention.

FIG. 3 is a schematic partial cutaway perspective view of a prismatic non-aqueous electrolyte secondary battery according to an embodiment of the present invention.

The battery includes a bottomed prismatic battery case 6, and an electrode group 9 and a non-aqueous electrolyte (not shown) that are housed in the battery case 6. The electrode group 9 includes an elongated strip-shaped negative electrode, an elongated strip-shaped positive electrode and a separator that is interposed between the negative electrode and the positive electrode to prevent them from coming into direct contact with each other. The electrode group 9 is formed by spirally winding the negative electrode, the positive electrode and the separator around a flat plate-shaped winding core, and then removing the winding core.

One end of a negative electrode lead 11 is attached to the negative electrode current collector of the negative electrode by welding or the like. One end of a positive electrode lead 14 is attached to the positive electrode current collector of the positive electrode by welding or the like. The other end of the negative electrode lead 11 is electrically connected to a negative electrode terminal 13 provided to a sealing plate 5. The other end of the positive electrode lead 14 is electrically connected to the battery case 6 that also serves as a positive electrode terminal. On the upper portion of the electrode group 9, a resin frame member 4 that separates the electrode group 9 and the sealing plate 5 and also separates the negative electrode lead 11 and the battery case 6 is disposed. The opening portion of the battery case 6 is sealed with the sealing plate 5.

EXAMPLES

Hereinafter, the present invention will be described specifically by way of examples and comparative examples. However, the present invention is not limited to the examples given below.

Example 1

[Preparation of Negative Electrode Material LSX]

Step (i)

Silicon dioxide and lithium carbonate were mixed such that the atomic ratio Si/Li was 1.05, the resulting mixture was baked in air at 950° C. for 10 hours, and thereby a lithium silicate represented by the formula: $Li_2O.2.1SiO_2$ (x=2.1) was obtained. The obtained lithium silicate was pulverized into particles with an average particle size of 10

Step (ii)

A lithium silicate ($Li_2O.2.1SiO_2$) with an average particle size of 10 μm and a raw silicon material (3N, with an average particle size of 10 μm) were mixed at a mass ratio of 50:50. Then, the resulting mixture was loaded into a pot (made of SUS, with a volume of 500 mL) of a planetary ball mill (P-5 available from Fritsch Co., Ltd.), 24 SUS balls (with a diameter of 20 mm) were placed in the pot, the pot was closed with a cover, and the mixture was pulverized at 200 rpm in an inert atmosphere for 50 hours.

Next, the mixture pulverized into particles was taken out of the pot in an inert atmosphere, and baked in an inert atmosphere at 600° C. for 4 hours. A sintered product of the mixture (LSX particles (matrix particles)) was thereby obtained.

After that, the LSX particles were pulverized and sieved through a 40 μm mesh, and then the sieved LSX particles were mixed with coal pitch (MCP 250 available from JFE Chemical Corporation). The mixture was baked in an inert atmosphere at 800° C. for 5 hours so as to cover the surface of each LSX particle with conductive carbon and form a conductive layer. The amount of the conductive layer covering LSX particles was 5 mass % of the total mass of the LSX particle and the conductive layer. After that, LSX particles A1 that had an average particle size of 10 μm and had a conductive layer were obtained by using a sieve.

[Analysis of LSX Particles]

The LSX particles A1 was subjected to XRD analysis, and it was found that the crystallite size of silicon particles calculated from the diffraction peaks attributed to the Si (111) plane by using the Scherrer formula was 15 nm. Also, the composition of the lithium silicate phase was analyzed by using the above-described methods (the high-frequency induction heating furnace combustion-infrared absorption method, the inert gas fusion-non-dispersive infrared absorption method, and the inductively coupled plasma-atomic emission spectroscopy (ICP-AES)), and it was found that the Si/Li ratio was 1.05, and the amount of $Li_2Si_2O_5$ measured by Si-NMR was 48 mass %. An SEM microscopic image of a cross section of an LSX particle A1 was observed, and it was confirmed that silicon particles with an average particle size of 50 nm were dispersed substantially uniformly in the matrix composed of $Li_2Si_2O_5.0.1SiO_2$ in the LSX particle A1. In an XRD pattern of the LSX particles A1, diffraction peaks derived from elementary substance Si and $Li_2Si_2O_5$ were mainly observed, and the peak intensity was Si>$Li_2Si_2O_5$. The LSX particles A1 were subjected to Si-NMR measurement, and it was found that the amount of $SiO_2$ was 7 mass % or less.

[Production of Negative Electrode]

A negative electrode active material A1 was prepared by mixing LSX particles A1 having a conductive layer and a graphite at a mass ratio of 5:95. Then, a negative electrode slurry was prepared by mixing the negative electrode active material A1 with sodium carboxymethyl cellulose (CMC-Na) and styrene-butadiene rubber (SBR) at a mass ratio of 97.5:1:1.5, adding water to the mixture, and thereafter stirring the mixture by using a mixer (T.K. HIVIS MIX available from PRIMIX Corporation). Next, the negative electrode slurry was applied to each surface of a copper foil such that the mass of the negative electrode material mixture per m$^2$ was 190 g, and the coating film was dried and rolled. A negative electrode in which a negative electrode material mixture layer having a density of 1.5 g/cm$^3$ was formed on each surface of the copper foil was thereby produced.

[Production of Positive Electrode]

A positive electrode slurry was prepared by mixing lithium cobalt oxide, acetylene black, and polyvinylidene fluoride at a mass ratio of 95:2.5:2.5, adding N-methyl-2-pyrrolidone (NMP) to the mixture, and then stirring the mixture by using a mixer (T.K. HIVIS MIX available from PRIMIX Corporation). Next, the positive electrode slurry was applied to each surface of an aluminum foil, and the coating film was dried and rolled. A positive electrode in which a positive electrode material mixture layer having a density of 3.6 g/cm$^3$ was formed on each surface of the aluminum foil was thereby produced.

[Preparation of Non-Aqueous Electrolyte Solution]

Anon-aqueous electrolyte solution was prepared by dissolving LiPF$_6$ at a concentration of 1.0 mol/L in a solvent mixture of ethylene carbonate (EC) and diethyl carbonate (DEC) mixed at a volume ratio of 3:7.

[Production of Non-Aqueous Electrolyte Secondary Battery]

An electrode group was produced by attaching a tab to each of the positive electrode and the negative electrode and spirally winding the positive electrode and the negative electrode with a separator interposed therebetween such that the tabs were positioned at the outermost circumferential portion. The electrode group was inserted into an outer casing made of an aluminum laminate film and then vacuum dried at 105° C. for 2 hours. Then, the non-aqueous electrolyte solution was injected, and the opening of the outer casing was sealed. A battery A1 was thereby obtained.

Comparative Examples 1 to 4 and Examples 2 to 5

LSX particles A2 to A5 and B1 to B4 were formed in the same manner as in Example 1, except that, in the step (i), silicon dioxide and lithium carbonate were mixed by changing the atomic ratio Si/Li within a range of 0.5 to 20 so as to prepare lithium silicates having predetermined compositions shown in Table 2. Then, batteries A2 to A5 of Examples 2 to 5 and batteries B1 to B4 of Comparative Examples 1 to 4 were produced by using the LSX particles A2 to A5 and B1 to B4, respectively.

Examples 6 to 8

LSX particles A6 to A8 in which X=3, 4 or 9 were obtained by washing the LSX particles of Examples 1 to 3 with an aqueous solution of sulfuric acid (4N) to remove Li$_2$SiO$_3$ and the like generated as by-products. Then, batteries A6 to A8 of Examples 6 to 8 were produced in the same manner as in Example 1, except that the LSX particles A6 to A8 were used.

Comparative Example 5

LSX particles B5 in which silicon particles with a crystallite size of 5 nm were dispersed substantially uniformly in the matrix of lithium silicate phase were formed in the same manner as in Example 1, except that, in the step (ii), the ball mill pulverization time was changed to 100 hours. Then, a battery B5 of Comparative Example 5 was produced in the same manner as in Example 1, except that the LSX particles B5 were used.

Comparative Example 6

LSX particles B6 in which silicon particles with a crystallite size of 5 nm were dispersed substantially uniformly in the matrix of lithium silicate phase were formed in the same manner as in Example 2, except that, in the step (ii), the ball mill pulverization time was changed to 100 hours. Then, a battery B6 of Comparative Example 6 was produced in the same manner as in Example 2, except that the LSX particles B6 were used.

Comparative Example 7

LSX particles B7 in which silicon particles with a crystallite size of 5 nm were dispersed substantially uniformly in the matrix of lithium silicate phase were formed in the same manner as in Example 3, except that, in the step (ii), the ball mill pulverization time was changed to 100 hours. Then, a battery B7 of Comparative Example 7 was produced in the same manner as in Example 3, except that the LSX particles B7 were used.

Comparative Example 8

SiO$_x$ particles each having a conductive layer were prepared by mixing SiO$_x$ (x=0.97, with an average particle size of 5 μm) with coal pitch described above, and baking the mixture in an inert atmosphere at 800° C. for 5 hours. Next, the SiO$_X$ particles having a conductive layer were washed with an aqueous solution of sulfuric acid (4N). A battery B8 was produced in the same manner as in Example 1, except that the acid-washed SiO$_X$ particles (B8) having a conductive layer were used.

The batteries of Examples 1 to 5 and Comparative Examples 1 to 8 were evaluated in the following manner. The evaluation results are shown in Table 2.

[Initial Charge/Discharge Efficiency]

<Charge>

Constant current charging was performed with a current of 1 It (800 mA) until the battery voltage reached 4.2 V, and thereafter constant voltage charging was performed with a constant voltage of 4.2 V until the battery current reached 1/20 It (40 mA).

<Discharge>

Constant current discharging was performed with a current of 1 It (800 mA) until the battery voltage reached 2.75 V.

The time interval between charging and discharging was set to 10 minutes. Each battery was charged and discharged under the above-described charge/discharge conditions, and the ratio of the discharge capacity relative to the charge capacity at the first cycle was determined as the initial charge/discharge efficiency.

[Cycle Test]

Each battery was subjected to a cycle test under the above-described charge/discharge conditions. The ratio of the discharge capacity at the 200th cycle relative to the discharge capacity at the first cycle was determined as the cycle retention rate.

TABLE 2

| Battery | Li$_2$O•$x$SiO$_2$ x value | Si Crystallite Size (nm) | Cycle Retention Rate (%) | Initial Charge/ Discharge Efficiency (%) |
|---|---|---|---|---|
| B1 | 0.5 | 15 | 60 | 80 |
| B2 | 1 | 15 | 70 | 78 |
| B3 | 2 | 15 | 71 | 79 |
| A1 | 2.1 | 15 | 75 | 80 |
| A2 | 3 | 15 | 77 | 79 |
| A3 | 8 | 15 | 80 | 78 |
| A4 | 15 | 15 | 75 | 80 |
| A5 | 18 | 15 | 75 | 80 |
| B4 | 20 | 15 | 75 | 65 |
| B5 | 2.1 | 5 | 74 | 68 |
| B6 | 3 | 5 | 78 | 70 |
| B7 | 8 | 5 | 78 | 71 |
| B8 | — | 5 | 75 | 70 |
| A6 | 3 | 15 | 74 | 79 |
| A7 | 4 | 15 | 77 | 79 |
| A8 | 9 | 15 | 79 | 80 |

As can be seen from Table 2, different behaviors are observed in the cycle characteristics between when the silicon particles have a crystallite size of 15 nm and when the silicon particles have a crystallite size of 5 nm, from which it can be understood that the cycle characteristics are dependent on the value of x. It can also be seen from Table 2 that, unlike when the silicon particles have a crystallite size of 15 nm, it is difficult to enhance the initial charge/discharge efficiency when the silicon particles have a crystallite size of 5 nm. Furthermore, it can be seen that the initial charge/discharge efficiency decreases when the value of x exceeds 18.

INDUSTRIAL APPLICABILITY

With the negative electrode material LSX according to the present invention, a non-aqueous electrolyte secondary battery in which a reduction in the initial efficiency can be suppressed and that has both a high energy density and good cycle characteristics can be provided. The non-aqueous electrolyte secondary battery according to the present invention is useful as a main power source in a mobile communication device, a portable electronic device or the like.

REFERENCE SIGNS LIST

4: Frame Member
5: Sealing Plate
6: Battery Case
9: Electrode Group
11: Negative Electrode Lead
13: Negative Electrode Terminal
14: Positive Electrode Lead
20: LSX Particle
21: Lithium Silicate Phase
22: Silicon Particle
23: Matrix Particle
24: Conductive Layer

The invention claimed is:

1. A negative electrode active material comprising:
a lithium silicate phase; and
silicon particles that are dispersed in the lithium silicate phase,
wherein the silicon particles have a crystallite size of 10 nm or more,
the lithium silicate phase has a composition represented by the following formula: $Li_2Si_2O_5 \cdot (x-2)SiO_2$, where $2 < x \leq 18$ is satisfied, and
wherein the negative electrode active material is a particulate material.

2. The negative electrode active material in accordance with claim 1,
wherein $2.1 \leq x \leq 18$ is satisfied.

3. The negative electrode active material in accordance with claim 1,
wherein $3 \leq x \leq 8$ is satisfied.

4. The negative electrode active material in accordance with claim 1,
wherein the lithium silicate phase and the silicon particles form the particulate material, and the particulate material that has an average particle size of 1 to 25 μm.

5. The negative electrode active material in accordance with claim 4, comprising
a conductive material that covers at least a portion of a surface of the particulate material.

6. The negative electrode active material in accordance with claim 1,
wherein the silicon particles have an average particle size of 500 nm or less.

7. The negative electrode active material in accordance with claim 6,
wherein the silicon particles have an average particle size of 200 nm or less.

8. A non-aqueous electrolyte secondary battery comprising:
a negative electrode that includes the negative electrode active material in accordance with claim 1 and a binder;
a positive electrode that is capable of electrochemically absorbing and desorbing lithium; and
a non-aqueous electrolyte.

\* \* \* \* \*